US012223366B2

United States Patent
Vliegen

(10) Patent No.: US 12,223,366 B2
(45) Date of Patent: Feb. 11, 2025

(54) FILTER INSTANTIATION FOR PROCESS GRAPHS OF RPA WORKFLOWS

(71) Applicant: UiPath, Inc., New York, NY (US)

(72) Inventor: Roeland Vliegen, Waalre (NL)

(73) Assignee: UiPath, Inc., New York, NY (US)

( * ) Notice: Subject to any disclaimer, the term of this patent is extended or adjusted under 35 U.S.C. 154(b) by 305 days.

(21) Appl. No.: 17/031,138

(22) Filed: Sep. 24, 2020

(65) Prior Publication Data

US 2022/0091908 A1 Mar. 24, 2022

(51) Int. Cl.
*G06F 15/16* (2006.01)
*G06F 9/54* (2006.01)
*G06F 16/901* (2019.01)

(52) U.S. Cl.
CPC .......... *G06F 9/541* (2013.01); *G06F 16/9024* (2019.01)

(58) Field of Classification Search
CPC ..... G06F 9/541; G06F 16/9024; H04L 67/40; H04L 63/0861; H04L 12/581; H04L 29/06
See application file for complete search history.

(56) References Cited

U.S. PATENT DOCUMENTS

| | | |
|---|---|---|
| 2004/0078373 A1 | 4/2004 | Ghoneimy et al. |
| 2008/0162616 A1 | 7/2008 | Gross et al. |
| 2008/0195964 A1 | 8/2008 | Randell |
| 2010/0010853 A1 | 1/2010 | Yano |
| 2013/0297562 A1 | 11/2013 | Stanfill et al. |
| 2014/0068560 A1* | 3/2014 | Eksten ................. G06F 8/70 717/120 |
| 2014/0100679 A1* | 4/2014 | Gilad ................. H04H 60/04 700/94 |
| 2014/0335480 A1* | 11/2014 | Asenjo ................. G06Q 10/06 434/107 |
| 2017/0213167 A1 | 7/2017 | Rinke et al. |
| 2017/0295243 A1* | 10/2017 | Kim ................. H04L 67/40 |
| 2017/0351406 A1 | 12/2017 | Rossi et al. |
| 2017/0372442 A1 | 12/2017 | Mejias |
| 2018/0101622 A1 | 4/2018 | Helvik et al. |
| 2019/0129824 A1* | 5/2019 | Radhakrishnan ... G06F 11/3664 |
| 2019/0130094 A1* | 5/2019 | Votaw ................. H04L 63/0861 |
| 2019/0141596 A1* | 5/2019 | Gay ................. G05B 19/4185 |
| 2019/0171670 A1 | 6/2019 | Zhuang et al. |
| 2019/0215283 A1* | 7/2019 | Nahum ................. G06F 3/0482 |
| 2019/0377735 A1 | 12/2019 | Weld et al. |

(Continued)

FOREIGN PATENT DOCUMENTS

| | | |
|---|---|---|
| JP | 2010020577 A | 1/2010 |
| JP | 2020068019 A | 4/2020 |

OTHER PUBLICATIONS

International Search Report and Written Opinion mailed Jun. 21, 2021, in connection with International Patent Application No. PCT/US2020/055865, filed Oct. 16, 2020, 9 pgs.

(Continued)

*Primary Examiner* — Razu A Miah
(74) *Attorney, Agent, or Firm* — Chiesa Shahinian & Giantomasi PC

(57) ABSTRACT

Systems and methods for instantiating a filter for a process graph are provided. A process graph of a workflow is received. Context data associated with the process graph is stored. A filter is instantiated to filter the process graph based on the stored context data. The filtered process graph is output.

17 Claims, 9 Drawing Sheets

(56) References Cited

U.S. PATENT DOCUMENTS

| | | | |
|---|---|---|---|
| 2020/0050983 A1 | 2/2020 | Balasubramanian et al. | |
| 2020/0206920 A1* | 7/2020 | Ma | G06Q 10/0633 |
| 2020/0265353 A1* | 8/2020 | Srivastava | G06F 30/23 |
| 2021/0374866 A1* | 12/2021 | Garg | G06F 16/252 |

OTHER PUBLICATIONS

Notice of Reasons for Refusal mailed Nov. 1, 2024 in connection with Japanese Patent Application No. 2021-572635, 8 pgs. (including translation).

* cited by examiner

FILTER INSTANTIATION FOR PROCESS GRAPHS OF RPA WORKFLOWS

TECHNICAL FIELD

The present invention relates generally to process mining for robotic process automation (RPA), and more particularly to filter instantiation for process graphs of RPA workflows for RPA process mining.

BACKGROUND

Robotic process automation (RPA) is a form of process automation that uses software robots to automate workflows. RPA may be implemented to automate repetitive and/or labor-intensive tasks to reduce costs and increase efficiency. In RPA process mining, the execution of RPA workflows by RPA robots is analyzed to identify trends, patterns, and other analytical measures in order to improve efficiency and gain a better understanding of the RPA workflows. The execution of such RPA workflows is typically represented as process graphs. To analyze the execution of the RPA workflows, various filters may be applied to such process graphs.

At times, multiple filters may be applied to a process graph to analyze the process graph. In one scenario, a first filter is initially applied to the process graph. Thereafter, a second filter is applied to the filtered process graph, which was previously filtered according to the first filter. This results in the second filter being defined to filter the process graph based on results of the filtering by the first filter. However, if the first filter were to then be modified or otherwise removed, the filtering provided by the second filter may be different than what was initially intended. Conventional approaches do not address this problem.

BRIEF SUMMARY OF THE INVENTION

In accordance with one or more embodiments, systems and methods for instantiating a filter for a process graph are provided. A process graph of a workflow is received. Context data associated with the process graph is stored. A filter is instantiated to filter the process graph based on the stored context data. The filtered process graph is output.

In one embodiment, the context data includes a state of an application prior to the instantiating of the filter. In another embodiment, the context data includes a duplicate of the process graph at a state prior to the instantiating of the filter. In another embodiment, the context data includes execution records of the process graph for a time prior to the instantiating of the filter.

In one embodiment, the process graph was previously filtered by a prior filter and the instantiated filter is defined based on the previously filtered process graph.

A modification of the prior filter may be received to modify the previously filtered process graph. The process graph may be filtered at a time after the receiving of the modification of the prior filter based on the stored context data associated with the process graph for a time immediately prior to the instantiating.

In one or more embodiments, the filter includes a loop depth filter or an activity filter. In one embodiment, the workflow is an RPA (robotic process automation) workflow.

These and other advantages of the invention will be apparent to those of ordinary skill in the art by reference to the following detailed description and the accompanying drawings.

DETAILED DESCRIPTION

Figure 1:
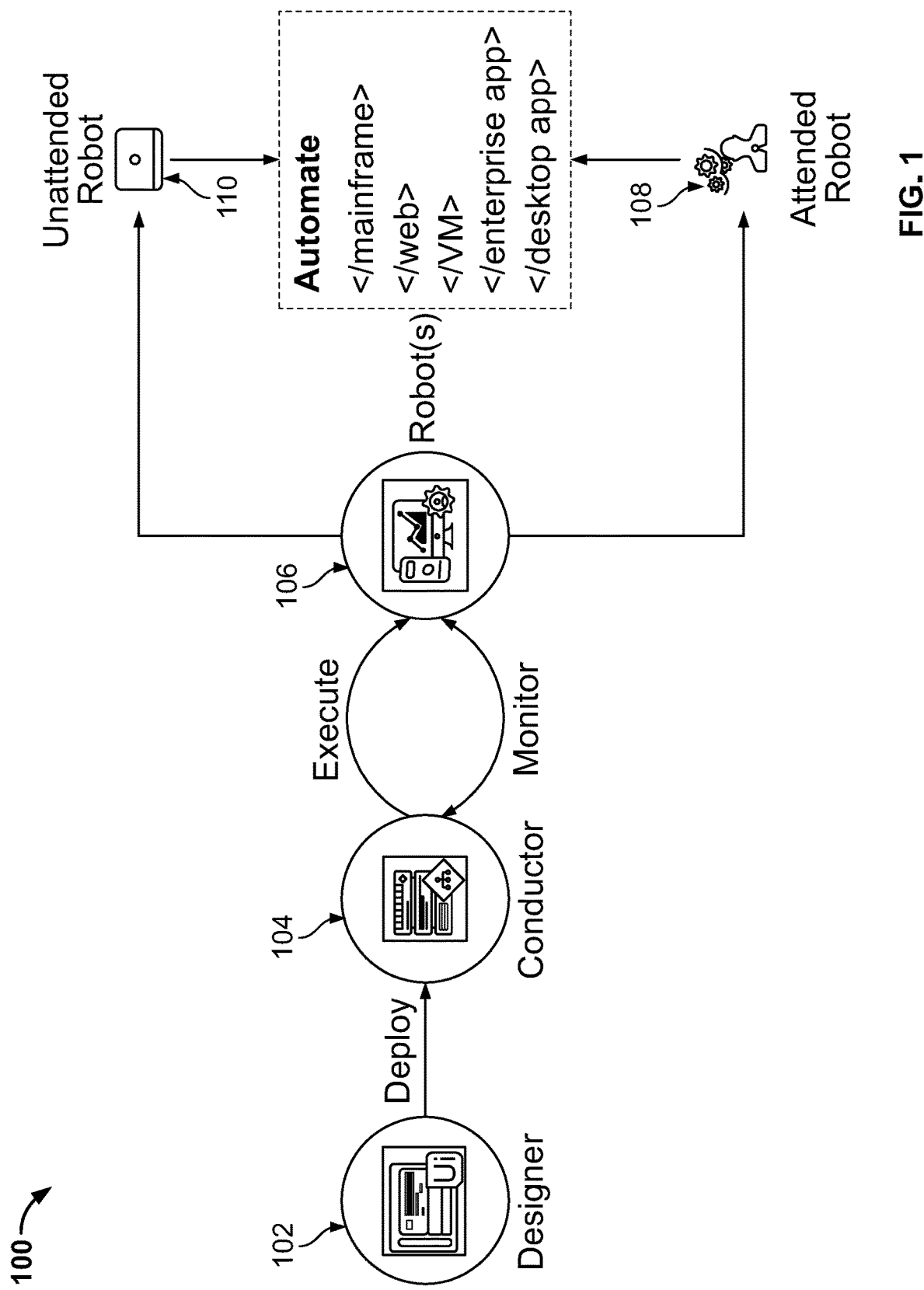
FIG. 1 is an architectural diagram illustrating a robotic process automation (RPA) system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of RPA robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
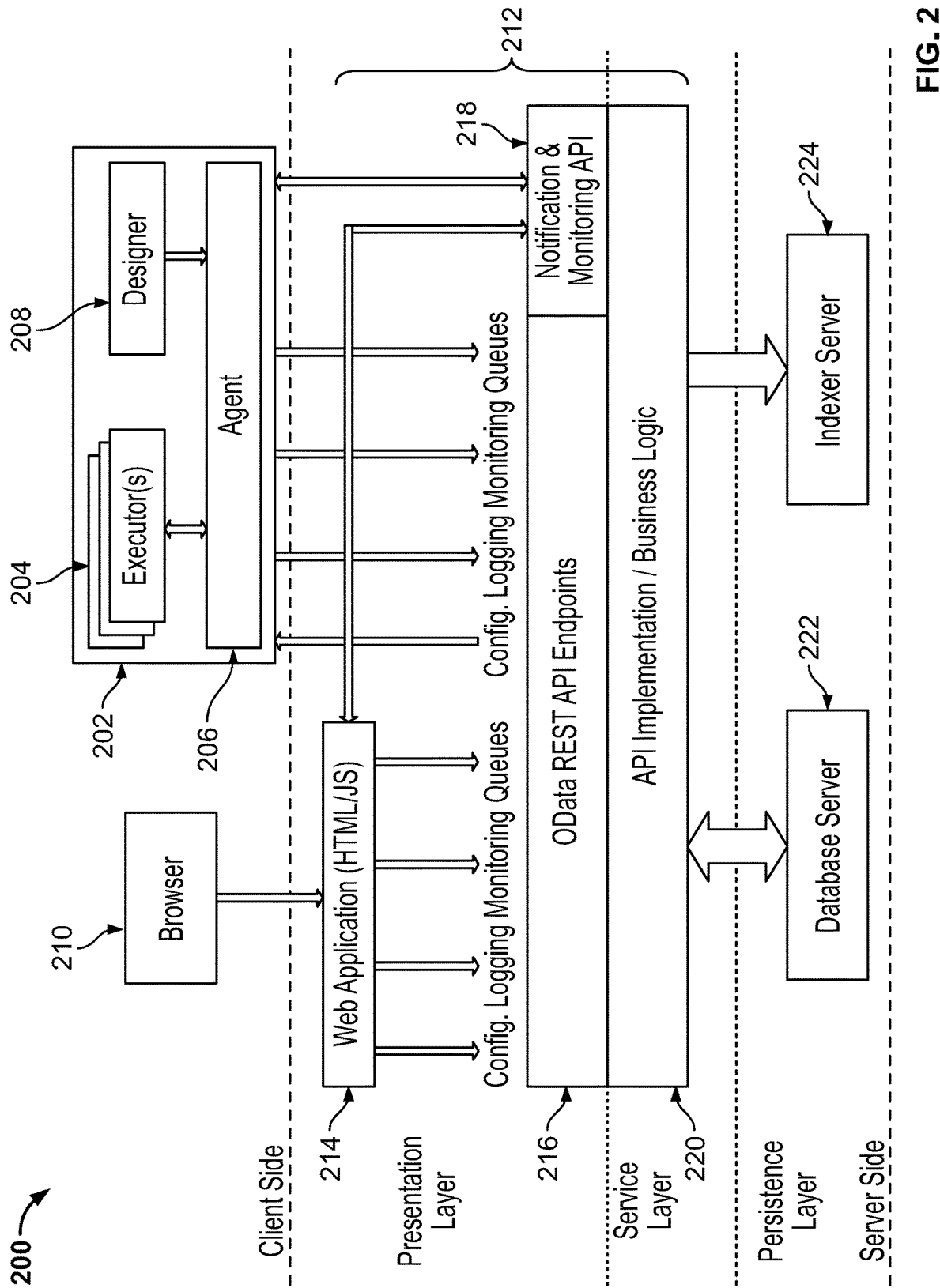
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
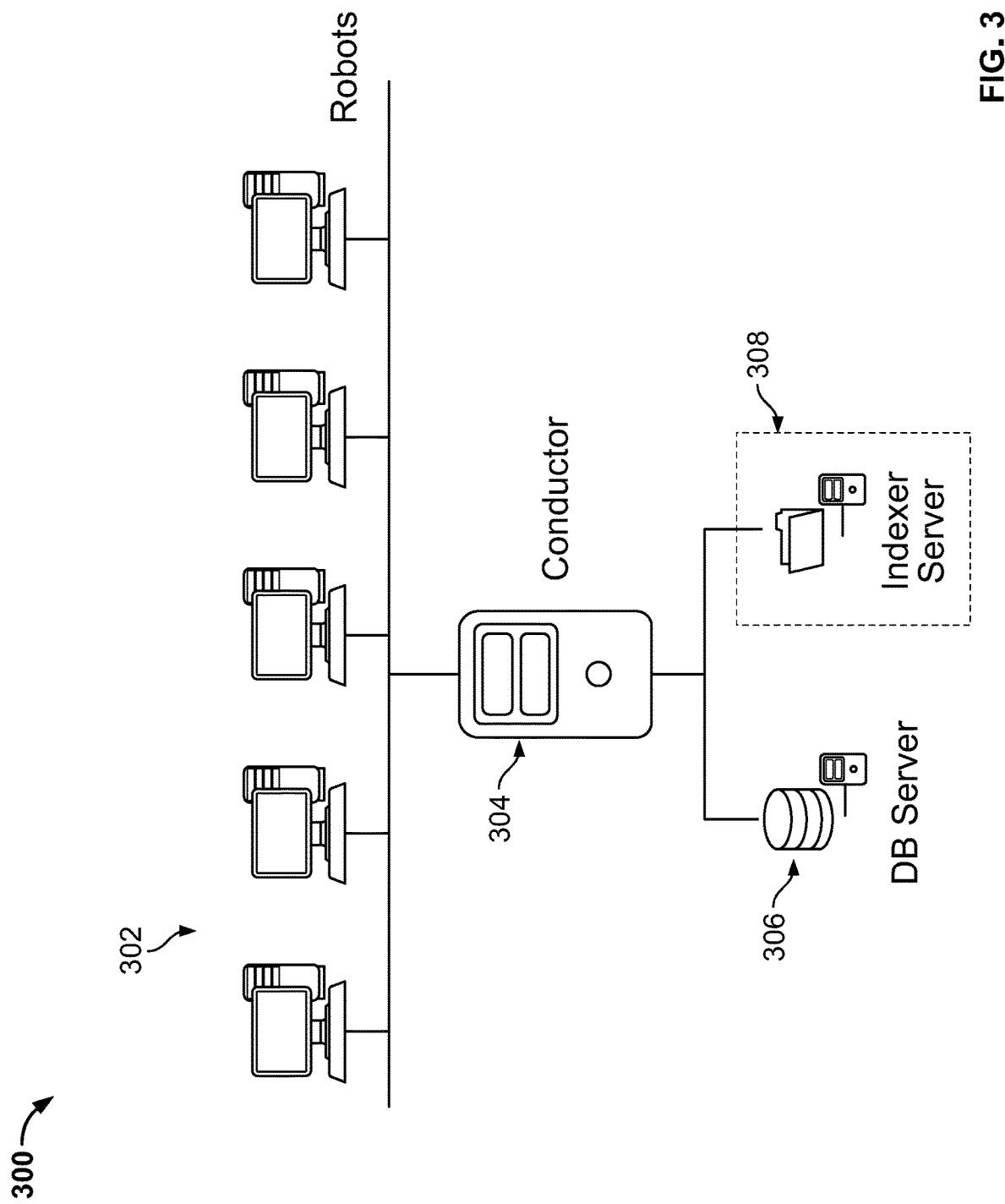
FIG. 3 is an architectural diagram illustrating a simplified deployment example of a RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 4:
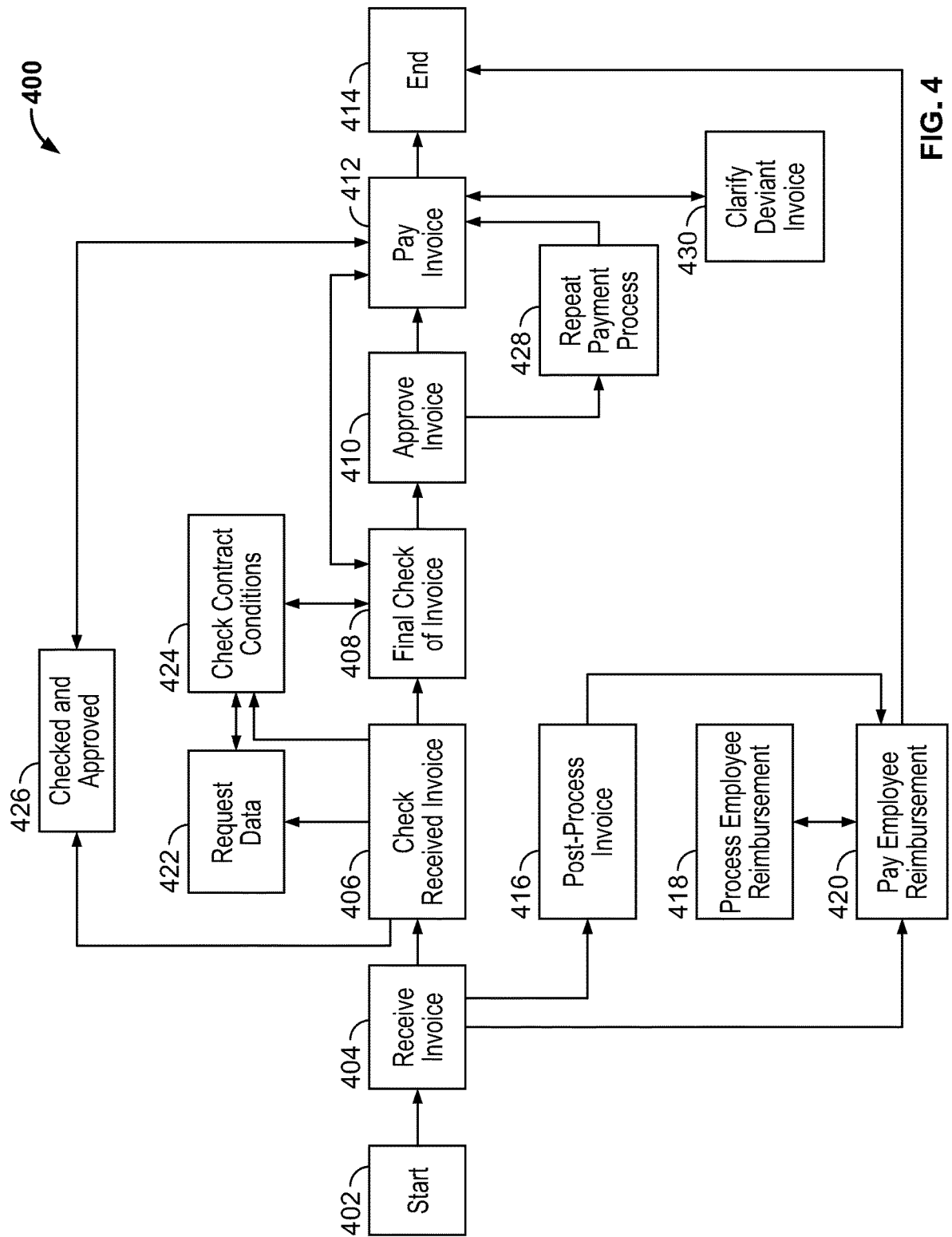
FIG. 4 shows an exemplary workflow.

FIG. 4 shows an exemplary workflow 400. Workflow 400 may be an RPA workflow automatically performed by one or more RPA robots. The RPA robots may be implemented by RPA system 100 of FIG. 1, RPA system 200 of FIG. 2, and/or RPA system 300 of FIG. 3. It should be understood that workflow 400 may be any suitable process that can be modelled as a workflow, and is not limited to an RPA workflow.

Workflow 400 comprises a plurality of activities 402-430 for automatically processing and paying an invoice. As shown in FIG. 4, workflow 400 is modelled as a directed graph where each activity 402-430 is represented as a node and each transition between activities 402-430 is represented as edges linking the nodes. The transition between activities 402-430 represents the execution of workflow 400 from a source activity to a destination activity. Workflow 400 is executed through various paths between start 402 and end 414.

In process mining, the execution of workflow 400 may be analyzed to identify trends, patterns, and other analytical measures in order to improve efficiency and gain a better understanding of the workflow 400. The execution of workflow 400 may be represented as a process graph. Various filters may be applied to the process graph to enable users to analyze the execution of workflow 400. In accordance with embodiments described herein, context data associated with a process graph of workflow 400 is stored and a filter to filter the process graph based on the stored context data is instantiated. Advantageously, the context data associated with the process graph is not lost, even if the process graph later changes due to, e.g., modification or removal of a prior filter previously applied to the process graph.

Figure 5:
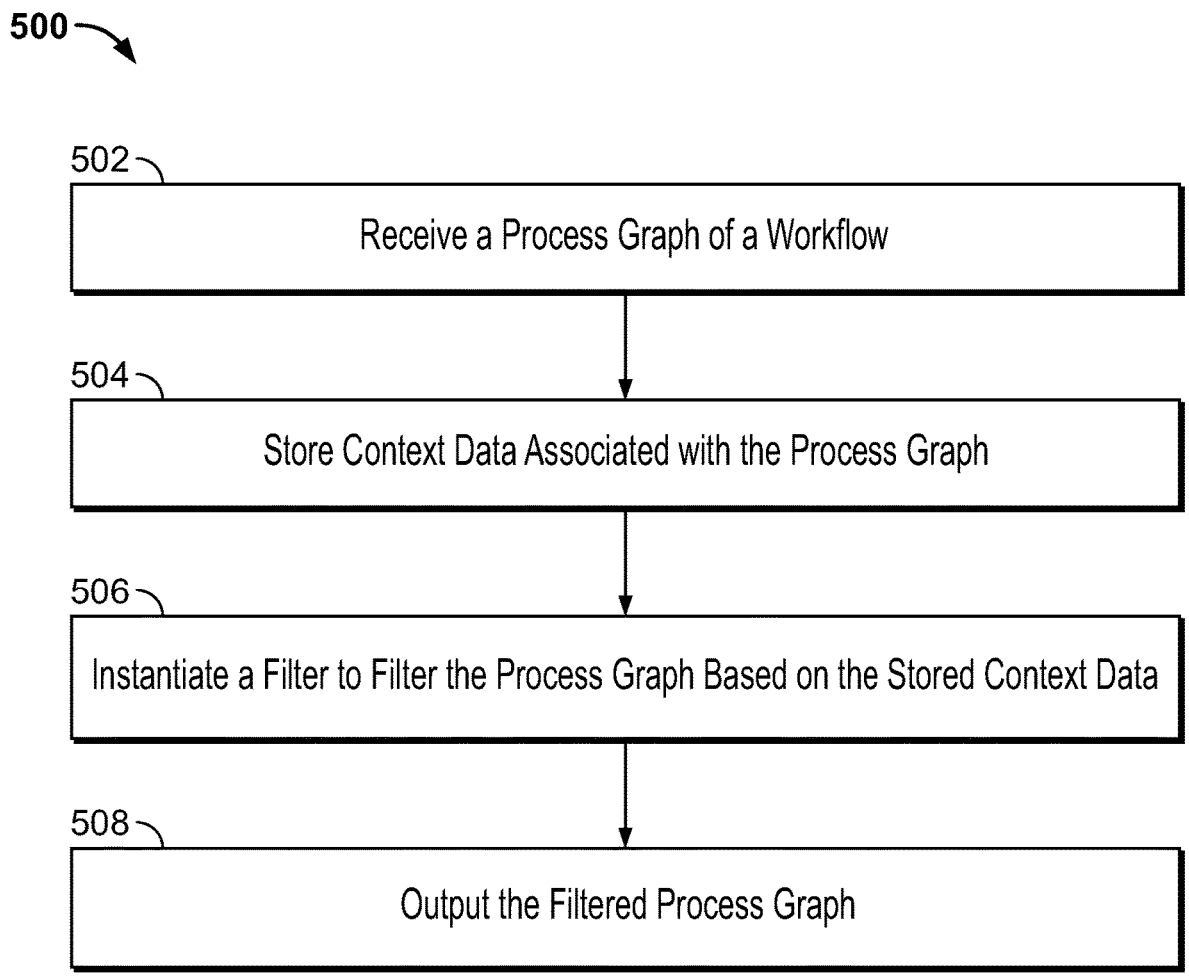
FIG. 5 shows a method for instantiating a filter to filter a process graph, according to an embodiment of the invention.

FIG. 5 shows a method 500 for instantiating a filter to filter a process graph, in accordance with one or more embodiments. Method 500 may be performed by one or more suitable computing devices, such as, e.g., computer 900 of FIG. 9.

At step 502, a process graph of a workflow is received. The process graph is a graph representing one or more instances of execution of a workflow. In one example, the workflow is workflow 400 of FIG. 4. In one embodiment, the workflow is an RPA workflow automatically performed by one or more RPA robots. However, it should be understood that the workflow may be any suitable workflow and is not limited to an RPA workflow. The process graph may be received by loading a previously stored process graph from a storage or memory (e.g., memory 906 of FIG. 9) of a computer system or by receiving a process graph transmitted from a remote computer system.

Figure 6:
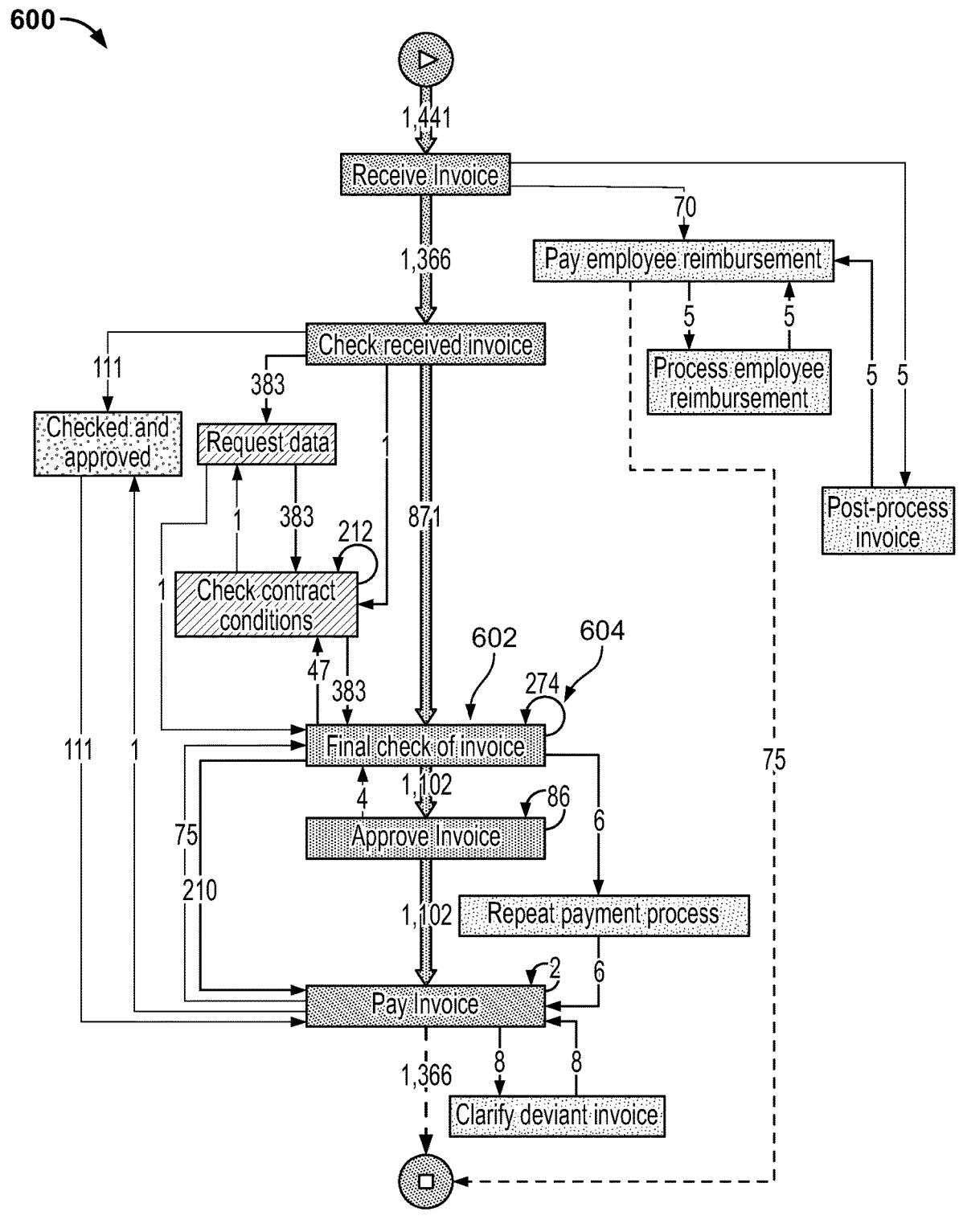
FIG. 6 shows an exemplary process graph associated with the workflow shown in FIG. 4, which may be analyzed according to an embodiment of the invention.

The process graph may be in any suitable form. For example, the process graph may be modeled based on BPMN (business process model and notation), Petri nets, process trees, or any other suitable notation or any other suitable format. FIG. 6 illustratively shows a process graph 600 of workflow 400 of FIG. 4, in accordance with one or more embodiments. Process graph 600 represents a plurality of instances of execution of workflow 400. Each instance of execution of workflow 400 is associated with a particular case and may be identified by a case identifier.

The process graph may be generated based on execution data associated with the workflow. In one embodiment, the execution data associated with the workflow includes an event log of the execution of the workflow. The event log is a log recording events of the execution of the workflow. Each event in the event log defines the execution of a particular activity, with a particular time stamp, and with a particular case identifier. It should be understood that the execution data may include any data representing the execution of the workflow and is not limited to an event log.

At step 504, context data associated with the process graph is stored. The context data may include any data associated with a current state of the process graph (i.e., a state of the process graph prior to, and immediately before, instantiating a filter to filter the process graph at step 506). The context data is stored in memory or storage, such as, e.g., memory 906 of FIG. 9.

In one embodiment, in a duplicate on demand approach, the context data associated with the process graph comprises a current state of a set of one or more process dashboarding applications or data relating to the set of process dashboarding applications (i.e., a state prior to, and immediately before, instantiating a filter to filter the process graph at step 506). The process dashboarding applications are applications for process analysis of the workflow. In this embodiment, the current state of the process dashboarding applications is duplicated to instantiate the filter on the current state, while being able to change the duplicated current state for subsequent user interaction. In general, the current state is determined by the combined state of all filters and the input data.

In one embodiment, in a process duplicates approach, the context data associated with the process graph comprises a duplicate or reproduction of the process graph at a current state (i.e., a state prior to, and immediately before, instantiating a filter to filter the process graph at step 506). The process graphs may be separately displayed so that a user may instantiate, remove, or modify a filter on a process graph depicted in one display without affecting the other process graph depicted in the other display.

In one embodiment, in a re-filtering using cache layers approach, the context associated with the instantiating of the filter comprises the current execution records of the process graph (i.e., execution records of the process graph prior to, and immediately before, instantiating a filter to filter the process graph at step 506). The execution records are stored in a cache layer, allowing the execution records to be quickly retrieved without recalculation at a later time for filtering the process graph on the basis of the execution records.

At step 506, a filter is instantiated to filter the process graph based on the stored context data. The instantiation of the filter refers to the creation of the filter by defining parameters for how the process graph is to be filtered and the application of the created filter to filter the process graph. The instantiated filter filters the process graph based on the stored context data by retrieving the stored context data from storage or memory (e.g., memory 906 of FIG. 9) and applying the instantiated filter on the retrieved context data. The filter may be instantiated in response to user input. The filter may be any filter suitable for filtering the process graph. Exemplary filters include loop depth filters and activity filters.

The loop depth of an activity refers to the number of times an activity loops or repeats itself in the process graph. For example, in process graph 600 of FIG. 6, looping behavior 604 is represented as an edge looping back into node 602, associated with the activity "Find Check of Invoice", to represent repetition of the activity 274 times. A loop depth filter filters nodes in the process graph to identify the nodes that do not satisfy a user defined loop depth threshold.

Figure 7:
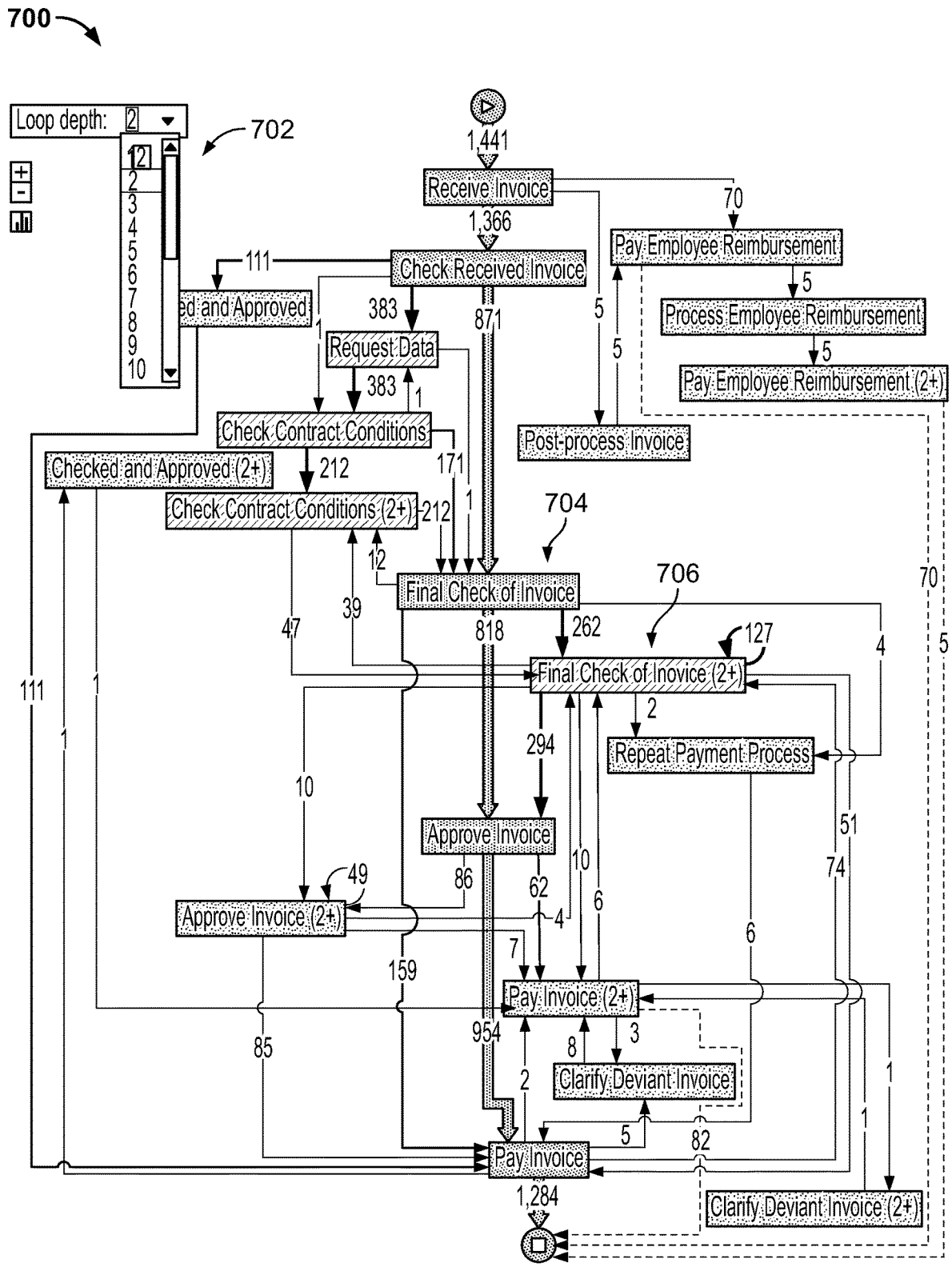
FIG. 7 shows an illustrative filtered process graph filtered according to a loop depth filter, according to an embodiment of the invention.

FIG. 7 shows an illustrative filtered process graph 700 filtered according to a loop depth filter, in accordance with one or more embodiments. Filtered process graph 700 shown in FIG. 7 is process graph 600 of FIG. 6 filtered with the loop depth filter. The loop depth filter is defined based on a user selection interface 702 to have a loop depth threshold of 2. Accordingly, process graph 600 in FIG. 6 is filtered to identify cases that do not satisfy the loop depth threshold (i.e., cases that execute an activity 2 or more times). As shown in FIG. 7, the loop depth filter is applied to process graph 600 to expand node 602 (in FIG. 6) into nodes 704 and 706, where node 704 corresponds to cases associated with a first instance of execution of the "Final Check of Invoice" activity and node 706 corresponds to cases associated with repeating instances of execution of the "Final Check of Invoice" activity (i.e., cases that repeat the "Final Check of Invoice" activity 2 or more times).

At step 508, the filtered process graph is output. The filtered process graph may be output by, for example, displaying the filtered process graph on a display device (e.g., display 910 of FIG. 9) of a computer system or by storing the filtered process graph on a memory or storage (e.g., memory 906 of FIG. 9) of a computer system.

Figure 8:
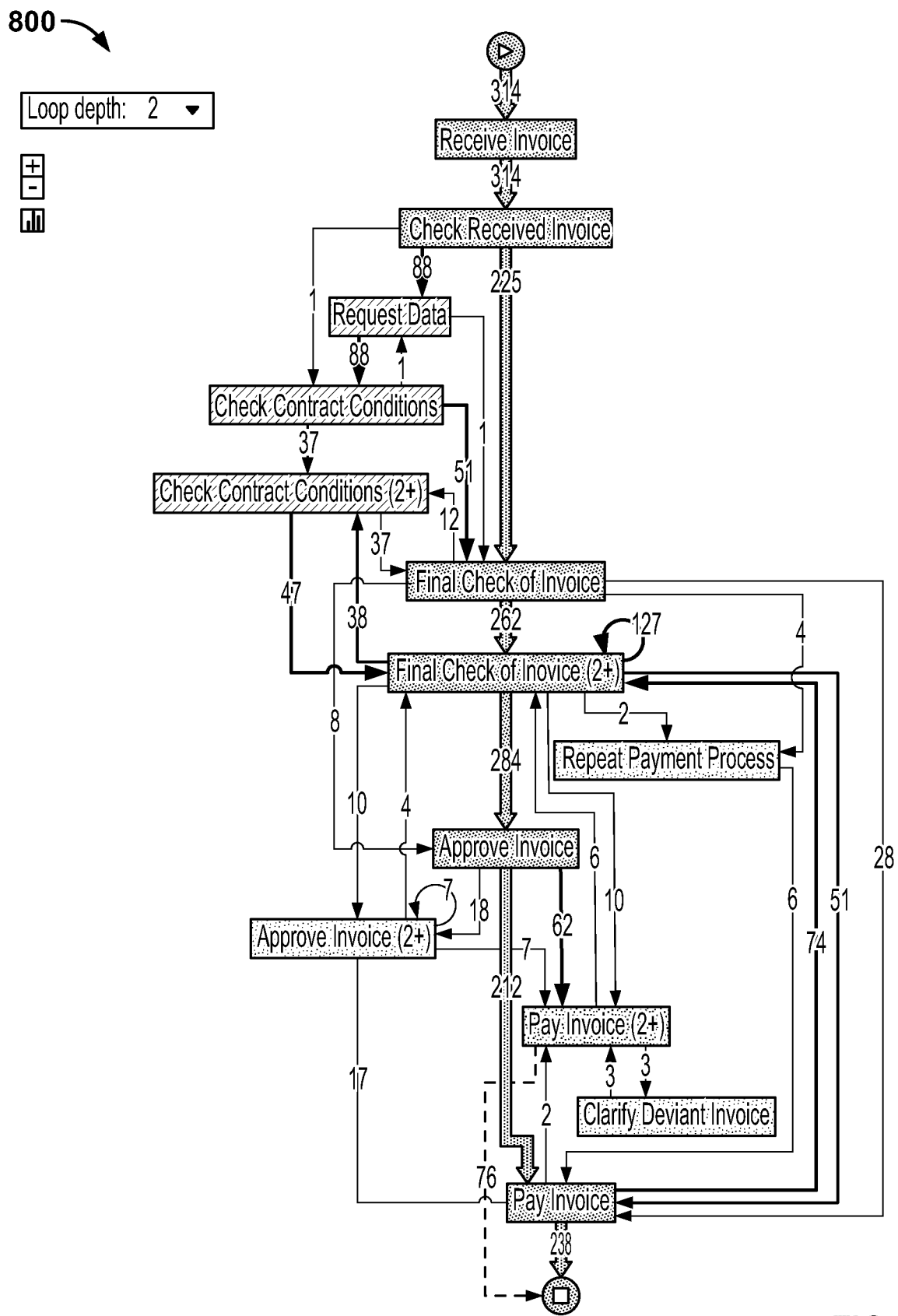
FIG. 8 shows an illustrative filtered process graph filtered according to an activity filter, according to an embodiment of the invention.

In one embodiment, the steps of method 500 may be iteratively repeated any number of times to apply any number of filters on the process graph. For example, FIG. 8 shows an illustrative filtered process graph 800 filtered according to an activity filter, in accordance with one or more embodiments. Filtered process graph 800 is process graph 700 of FIG. 7 further filtered with the activity filter. Process graph 700 was previously filtered with a prior loop depth filter with a loop depth threshold of 2, as discussed above with respect to FIG. 7. In accordance with method 500, process graph 700 is received (step 502), context data associated with process graph 700 is stored (step 504), the activity filter is instantiated to filter the process graph based on the stored context data (step 506) to generate filtered process graph 800, and filtered process graph 800 is output. The activity filter is defined based on the previously filtered process graph 700. Specifically, the activity filter is defined to identify all cases that include a node for the activity "Final Check of Invoice (2+)".

In one embodiment, a modification of the prior filter may be received to modify the previously filtered process graph. For example, in filtered process graph 800, a modification of the prior loop depth filter may be received to remove the loop depth filter or modify parameters of the loop depth filter to change the loop depth threshold. Such modification of the prior loop depth filter would result in the node for the activity "Final Check of Invoice (2+)" no longer existing. However, in accordance with embodiments described herein, the activity filter defined to identify all cases that include a node for the activity "Final Check of Invoice (2+)" filters the process graph based on the stored context data for a time immediately prior to the instantiating to therefore generate filtered process graph 800, even if the node for the activity "Final Check of Invoice (2+)" no longer exist due to modification of the prior loop depth filter.

Figure 9:
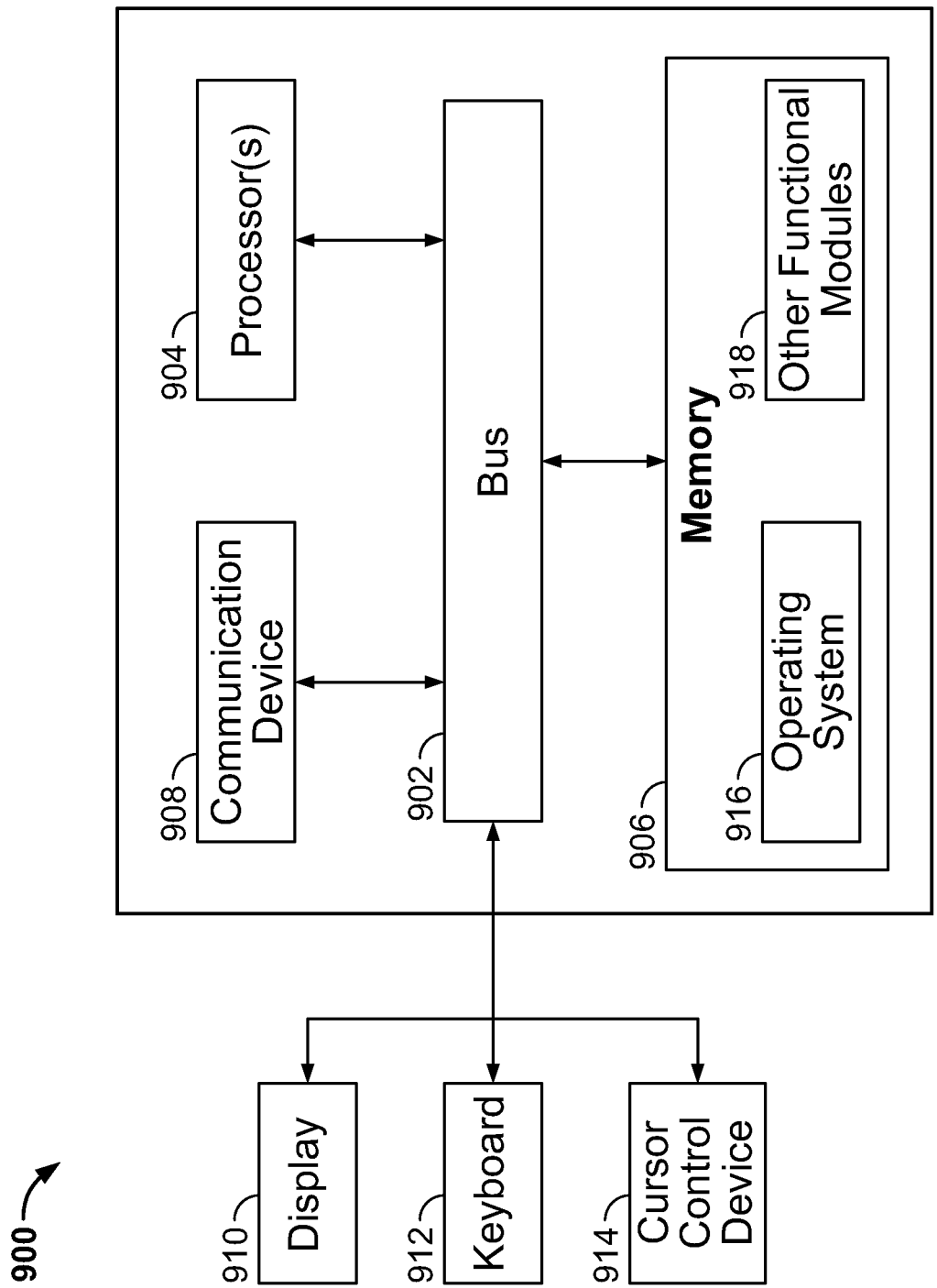
FIG. 9 is a block diagram of a computing system according to an embodiment of the invention.

FIG. 9 is a block diagram illustrating a computing system 900 configured to execute the methods, workflows, and processes described herein, including the method shown in FIG. 5, according to an embodiment of the present invention. In some embodiments, computing system 900 may be one or more of the computing systems depicted and/or described herein. Computing system 900 includes a bus 902 or other communication mechanism for communicating information, and processor(s) 904 coupled to bus 902 for processing information. Processor(s) 904 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 904 may also have multiple processing cores, and at least some of the cores may be configured to perform specific functions. Multi-parallel processing may be used in some embodiments.

Computing system 900 further includes a memory 906 for storing information and instructions to be executed by processor(s) 904. Memory 906 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 904 and may include volatile media, non-volatile media, or both. The media may also be removable, non-removable, or both.

Additionally, computing system 900 includes a communication device 908, such as a transceiver, to provide access to a communications network via a wireless and/or wired connection according to any currently existing or future-implemented communications standard and/or protocol.

Processor(s) 904 are further coupled via bus 902 to a display 910 that is suitable for displaying information to a user. Display 910 may also be configured as a touch display and/or any suitable haptic I/O device.

A keyboard 912 and a cursor control device 914, such as a computer mouse, a touchpad, etc., are further coupled to bus 902 to enable a user to interface with computing system. However, in certain embodiments, a physical keyboard and mouse may not be present, and the user may interact with the device solely through display 910 and/or a touchpad (not shown). Any type and combination of input devices may be used as a matter of design choice. In certain embodiments, no physical input device and/or display is present. For instance, the user may interact with computing system 900 remotely via another computing system in communication therewith, or computing system 900 may operate autonomously.

Memory 906 stores software modules that provide functionality when executed by processor(s) 904. The modules include an operating system 916 for computing system 900 and one or more additional functional modules 918 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
storing context data associated with a process graph representing one or more instances of execution of a workflow, wherein the process graph was previously filtered by a prior filter;
instantiating a filter based on the process graph;
receiving a modification of the prior filter to modify the process graph;
filtering, using the instantiated filter, the process graph at a time after the receiving of the modification of the prior filter, the process graph filtered based on the stored context data associated with the process graph for a time immediately prior to the instantiating; and
outputting the filtered process graph.

2. The computer-implemented method of claim 1, wherein the context data comprises a state of an application prior to the instantiating of the filter.

3. The computer-implemented method of claim 1, wherein the context data comprises a duplicate of the process graph at a state prior to the instantiating of the filter.

4. The computer-implemented method of claim 1, wherein the context data comprises execution records of the process graph for a time prior to the instantiating of the filter.

5. The computer-implemented method of claim 1, wherein the workflow is an RPA (robotic process automation) workflow.

6. The computer-implemented method of claim 1, wherein the filter comprises a loop depth filter.

7. The computer-implemented method of claim 1, wherein the filter comprises an activity filter.

8. An apparatus comprising:
a memory storing computer instructions; and
at least one processor configured to execute the computer instructions, the computer instructions configured to cause the at least one processor to perform operations of:
storing context data associated with a process graph representing one or more instances of execution of a workflow, wherein the process graph was previously filtered by a prior filter;
instantiating a filter based on the process graph;
receiving a modification of the prior filter to modify the process graph;
filtering, using the instantiated filter, the process graph at a time after the receiving of the modification of the prior filter, the process graph filtered based on the stored context data associated with the process graph for a time immediately prior to the instantiating; and
outputting the filtered process graph.

9. The apparatus of claim 8, wherein the context data comprises a state of an application prior to the instantiating of the filter.

10. The apparatus of claim 8, wherein the context data comprises a duplicate of the process graph at a state prior to the instantiating of the filter.

11. The apparatus of claim 8, wherein the context data comprises execution records of the process graph for a time prior to the instantiating of the filter.

12. The apparatus of claim 8, wherein the process graph was previously filtered by a prior filter and the instantiated filter is defined based on the previously filtered process graph.

13. A non-transitory computer readable medium storing computer program instructions, the computer program instructions when executed by at least one processor cause the at least one processor to perform operations comprising:
storing context data associated with a process graph representing one or more instances of execution of a workflow, wherein the process graph was previously filtered by a prior filter;
instantiating a filter based on the process graph;
receiving a modification of the prior filter to modify the process graph;
filtering, using the instantiated filter, the process graph at a time after the receiving of the modification of the prior filter, the process graph filtered based on the stored context data associated with the process graph for a time immediately prior to the instantiating; and
outputting the filtered process graph.

14. The non-transitory computer readable medium of claim 13, wherein the context data comprises a state of an application prior to the instantiating of the filter.

15. The non-transitory computer readable medium of claim 13, wherein the context data comprises a duplicate of the process graph at a state prior to the instantiating of the filter.

16. The non-transitory computer readable medium of claim 13, wherein the context data comprises execution records of the process graph for a time prior to the instantiating of the filter.

17. The non-transitory computer readable medium of claim 13, wherein the workflow is an RPA (robotic process automation) workflow.

* * * * *